US010280899B2

(12) United States Patent
Eichert et al.

(10) Patent No.: US 10,280,899 B2
(45) Date of Patent: May 7, 2019

(54) ARRANGEMENT FOR FEEDING ELECTRICAL ENERGY INTO AN ENERGY SUPPLY SYSTEM

(75) Inventors: Christian Eichert, Berlin (DE); Stefan Kolb, Berlin (DE)

(73) Assignee: VENPOWER GMBH, Ruthnick (DE)

( * ) Notice: Subject to any disclaimer, the term of this patent is extended or adjusted under 35 U.S.C. 154(b) by 961 days.

(21) Appl. No.: 13/995,665

(22) PCT Filed: Jan. 6, 2012

(86) PCT No.: PCT/EP2012/050171
§ 371 (c)(1),
(2), (4) Date: Sep. 17, 2013

(87) PCT Pub. No.: WO2012/095364
PCT Pub. Date: Jul. 19, 2012

(65) Prior Publication Data
US 2014/0292088 A1    Oct. 2, 2014

(30) Foreign Application Priority Data
Jan. 12, 2011    (EP) ..................................... 11150695

(51) Int. Cl.
*H02J 3/38*     (2006.01)
*F03D 9/25*     (2016.01)
(Continued)

(52) U.S. Cl.
CPC .............. *F03D 9/255* (2017.02); *F03B 13/00* (2013.01); *H02J 3/38* (2013.01); *H02J 3/382* (2013.01);
(Continued)

(58) Field of Classification Search
CPC ............... H02J 3/382; H02J 3/38; H02M 7/00
See application file for complete search history.

(56) References Cited

U.S. PATENT DOCUMENTS 4,780,634 A * 10/1988 Masterman ............ H02K 21/48
310/156.38
5,083,039 A *  1/1992 Richardson ........... F03D 7/0272
290/44
(Continued)

FOREIGN PATENT DOCUMENTS

DE    198 45 903 A1    4/2000
EP    1 561 945 A2    8/2005
(Continued)

OTHER PUBLICATIONS

International Preliminary Report of Patentability for PCT/EP2012/050171; dated Jul. 16, 2013; 6 pages.
(Continued)

*Primary Examiner* — Thienvu V Tran
*Assistant Examiner* — Pinping Sun
(74) *Attorney, Agent, or Firm* — Gordon Rees Scully Mansukhani, LLP

(57) ABSTRACT

The invention relates to an arrangement (10) for feeding electrical energy into an energy supply system (100). The invention provides that the arrangement has a generator (20) with electrically isolated winding systems (30), the arrangement has at least two frequency converters (40, 41, 42) with isolated intermediate circuits (60), wherein each frequency converter is connected directly or indirectly to a winding system (30) of the generator, the arrangement has at least one control device (80), to which the frequency converters are connected for actuation thereof, and the frequency converters, on actuation by the control device, feed current by means of a voltage with a multi-level characteristic into the energy supply system (100).

17 Claims, 4 Drawing Sheets

Figure 1:
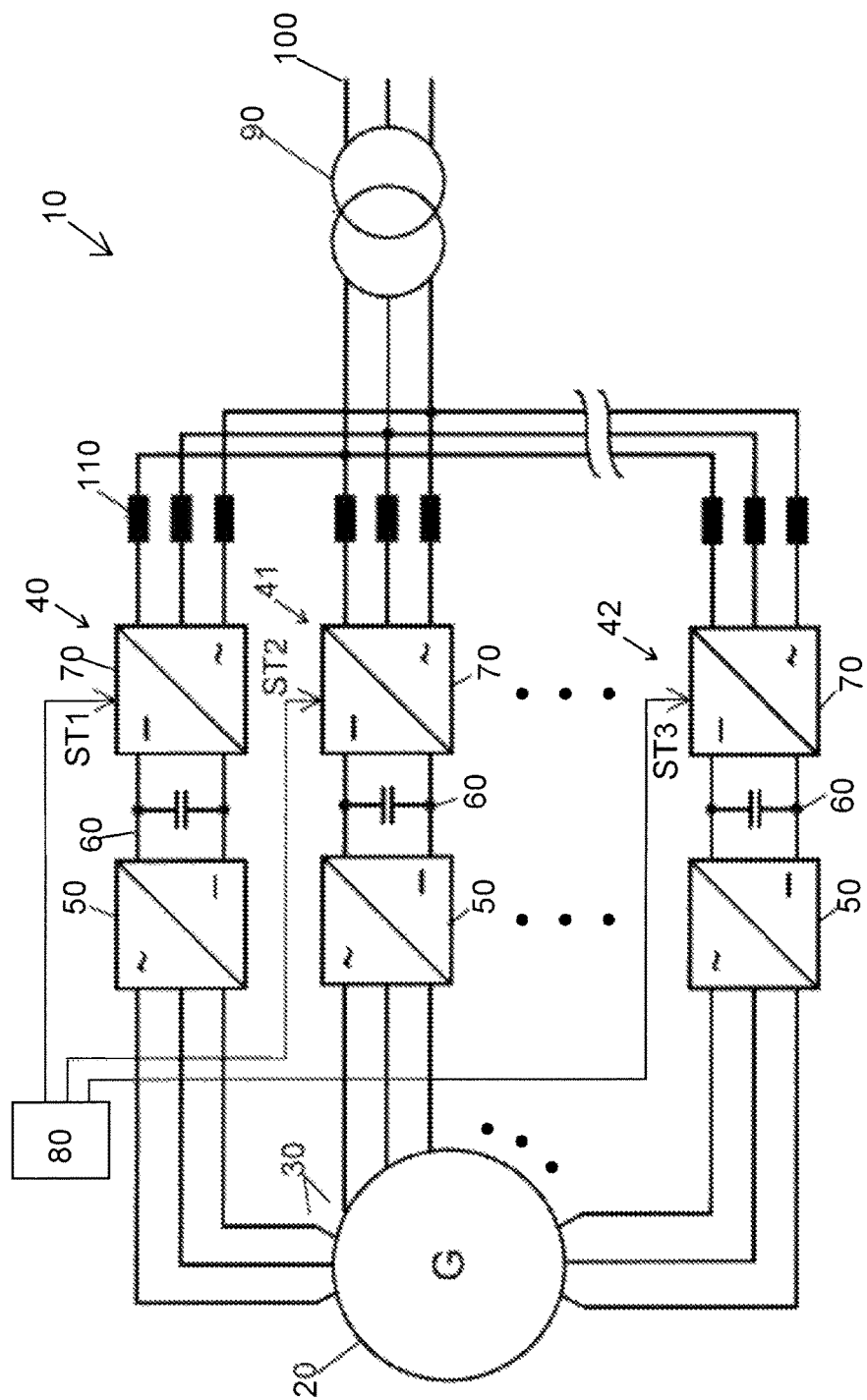

(51) Int. Cl.
*H02M 7/00* (2006.01)
*F03B 13/00* (2006.01)
*H02J 3/46* (2006.01)

(52) U.S. Cl.
CPC .................. *H02J 3/46* (2013.01); *H02M 7/00* (2013.01); *H02J 3/386* (2013.01); *Y02E 10/725* (2013.01); *Y02E 10/763* (2013.01); *Y10T 307/707* (2015.04)

(56) References Cited

U.S. PATENT DOCUMENTS

| | | | | |
|---|---|---|---|---|
| 5,657,217 | A * | 8/1997 | Watanabe | H02M 7/49 363/71 |
| 6,084,790 | A * | 7/2000 | Wong | H02M 3/1584 323/272 |
| 6,437,996 | B1 * | 8/2002 | Wobben | F03D 9/003 363/37 |
| 6,566,764 | B2 * | 5/2003 | Rebsdorf | F03D 9/003 290/44 |
| 6,836,028 | B2 * | 12/2004 | Northrup | F03D 9/002 290/44 |
| 7,015,595 | B2 * | 3/2006 | Feddersen | F03D 7/0224 290/44 |
| 7,928,592 | B2 * | 4/2011 | Wagoner | H02M 7/493 290/44 |
| 7,940,537 | B2 * | 5/2011 | Abolhassani | H02M 7/49 363/37 |
| 8,610,308 | B2 * | 12/2013 | Shires | H02J 1/10 307/73 |
| 2001/0022736 | A1 * | 9/2001 | Suzuki | H02M 1/4233 363/69 |
| 2008/0197706 | A1 * | 8/2008 | Nielsen | H02J 1/102 307/66 |
| 2009/0295229 | A1 * | 12/2009 | Harke | H02M 7/217 307/75 |
| 2009/0302686 | A1 * | 12/2009 | Fishman | H02M 7/49 307/82 |
| 2010/0133816 | A1 * | 6/2010 | Abolhassani | H02K 3/28 290/44 |
| 2010/0237975 | A1 * | 9/2010 | Lai | H01F 27/2804 336/170 |
| 2011/0198847 | A1 * | 8/2011 | Hopewell | H02M 1/34 290/44 |
| 2011/0198936 | A1 * | 8/2011 | Graovac | H02M 7/79 307/82 |
| 2012/0069610 | A1 * | 3/2012 | Trainer | H02M 7/49 363/35 |
| 2012/0126628 | A1 * | 5/2012 | Bjerknes | F03D 7/0224 307/84 |

FOREIGN PATENT DOCUMENTS

| | | |
|---|---|---|
| WO | WO-2006/120033 A2 | 11/2006 |
| WO | WO-2009/003959 A2 | 1/2009 |
| WO | WO 2009003959 A2 * | 1/2009 ............. H02M 7/49 |

OTHER PUBLICATIONS

International Search Report for PCT/EP2012/050171; dated Apr. 17, 2012; 3 pages.

* cited by examiner

ARRANGEMENT FOR FEEDING ELECTRICAL ENERGY INTO AN ENERGY SUPPLY SYSTEM

The invention relates to an arrangement having the features in accordance with the preamble of patent claim 1.

Such an arrangement is known from the international patent application WO 2009/003959 A1. This patent application describes an inverter arrangement with a DC voltage connection, to which a DC voltage can be applied, a load connection for connecting a load, a plurality of inverters connected in parallel, whose inputs are coupled jointly to the DC voltage connection and whose outputs are coupled jointly to the load connection via one or more inductances, and a control device for controlling the inverters depending on a preset vector of a superordinate control or regulation unit. The control device is designed to actuate the inverters in such a way that the output voltage at the load connection assumes a specific state from a number of different states depending on the preset vector of a superordinate control or regulation unit, wherein at least some states of the output voltage can be achieved by a number of different combinations of operating states of the inverters, and the control device selects, for each state of the output voltage, that combination of operating states of the inverters from the number of different combinations in which a desired criterion is met as optimally as possible. In addition, the control device is embodied in such a way that the individual inverters can be supplied different potential control commands in order to generate more than two levels in the output voltage.

The invention is based on the object of specifying an arrangement for feeding electrical energy into an energy supply system, wherein the arrangement will have improved electrical properties in relation to previously known arrangements of this type.

This object is achieved according to the invention by an arrangement having the features according to patent claim 1. Advantageous configurations of the arrangement according to the invention are specified in the dependent claims.

According to said claims, the invention provides that the arrangement has a generator with electrically isolated winding systems, the arrangement has at least two frequency converters with isolated intermediate circuits, wherein each frequency converter is connected directly or indirectly to a winding system of the generator and, the arrangement has at least one control device, to which the frequency converters are connected for actuation thereof, wherein the frequency converters, on actuation by the control device, feed current by means of a voltage with a multi-level characteristic into the energy supply system.

An essential advantage of the arrangement according to the invention consists in that, in contrast to the arrangement described at the outset previously known from the international patent application WO 2009/003959 A1, for example, the frequency converters do not have a common intermediate circuit as energy store, but that instead each frequency converter has its own intermediate circuit, wherein the intermediate circuits are electrically isolated from one another. Owing to this electrical isolation, it is possible to avoid undesirable circulating currents occurring in the intermediate circuits and in the frequency converters; nevertheless, multi-level actuation, as takes place in the previously known arrangement described at the outset, continues to be possible.

A preferred configuration provides that the at least two frequency converters each generate a partial voltage, and the voltage with the multi-level characteristic is formed by the partial voltages of the at least two frequency converters.

The voltage with the multi-level characteristic is preferably formed by the partial voltages of the at least two frequency converters by or incorporating phasor addition of voltage phasors.

Preferably, the voltage with the multi-level characteristic is formed by or incorporating a phasor addition of the voltage phasors of the partial voltages. Alternatively, the voltage with the multi-level characteristic is formed by or incorporating a phasor addition of voltage phasors which are proportional to the voltage phasors of the partial voltages.

The control device preferably actuates the frequency converters in such a way that the voltage with the multi-level characteristic which is formed by the partial voltages of the frequency converters has the best possible correspondence or at least approximately corresponds to the system voltage of the energy supply system.

Particularly preferably, the control device actuates the frequency converters in such a way that the voltage with the multi-level characteristic deviates from the system voltage to the extent that a desired active and reactive power feed into the energy supply system takes place.

Preferably, the control device determines the switching states of the individual frequency converters.

Particularly preferably, the control device determines the switching states of the individual frequency converters with the aid of a multi-level PWM (pulse width modulation) modulator with at least three levels.

The potentials effective for impressing the system currents in the individual phases at the system connection point are preferably determined by the mean value for the potentials which are present at the system-side phase connections of the respective phase of the at least two frequency converters. This mean value can be weighted, for example by existing asymmetrical impedances, for example inductors of different inductance, between the system-side phase connections of the frequency converters and the coupling point of the at least two frequency converters. Then, a finite number of values in accordance with the number of frequency converters and the nature of the indirect coupling results for the instantaneous time value of the mean value.

Therefore, preferably a targeted selection of the initial states of the at least two frequency converters takes place with the multi-level actuation, wherein the initial state of a frequency converter determines the potential present at the individual phase outputs of the frequency converter. In this context, "targeted" means in particular that the potential which is effective in a phase for impressing the system current in this phase is set by the mean time value of the next-possible lower and next-possible higher potential.

The control device preferably realizes multi-level actuation at least for the system side. The setpoint values for the potentials to be realized which are effective for impressing the system currents in the respective phases are generated either in the control device itself or by a superordinate controller. This may be, for example, the outputs of a field-oriented controller.

Electrically isolated intermediate circuits are for example those which are not directly connected to one another and/or those in which no potential compensation can take place between the intermediate circuits without any switching operation of the system-side inverters.

The frequency converters are preferably connected indirectly in parallel in the individual phases on the energy supply system side.

Electrically isolated intermediate circuits can be formed, for example, by electrically isolated generators. Alternatively, it is possible to form electrically isolated intermediate circuits using a single generator, which has electrically isolated windings. The intermediate circuits are preferably DC voltage intermediate circuits.

A particularly advantageous configuration provides that the at least two frequency converters each have a rectifier, a DC voltage intermediate circuit and an inverter, the rectifiers and the DC voltage intermediate circuits of the at least two frequency converters are electrically isolated from one another, and the control device is connected to the inverters of the frequency converters.

The rectifiers and the inverters are preferably polyphase components or components with polyphase operation, for example three-phase or four-phase components. A polyphase rectifier is in this context understood to mean a rectifier which can convert a polyphase AC voltage (for example three-phase voltage) into a DC voltage. A polyphase inverter is understood to mean an inverter which can convert a DC voltage into a polyphase AC voltage.

The rectifiers and the inverters can transport the energy preferably in both directions, i.e. both in the direction of the energy supply system and in the opposite direction. In the last-mentioned case, the rectifiers, when viewed in the direction of energy flow, operate as inverters and the inverters operate as rectifiers.

The inverters and the rectifiers operating as inverters in the case of an inverse direction of energy flow are preferably configured in such a way that they can adjust the phase angle between the voltage generated on the output side and the current provided on the outside side as desired, at least virtually as desired. For this purpose, the components preferably have corresponding control signal inputs for adjusting the phase angle.

The rectifiers and/or the inverters can contain active components, for example semiconductor switches, or else alternatively operate passively (for example by means of diodes).

The control device can be associated with a frequency converter; as an alternative, and this is considered to be advantageous, the control device can be distributed between a plurality of (at least two) or all of the frequency converters.

It is also considered to be advantageous if the control device is configured in such a way that it actuates the frequency converters with individual pulse-width-modulated control signals.

Preferably, the control device is configured in such a way that it generates control signals for the frequency converters using a space vector method.

It is also considered to be advantageous if the control device is configured in such a way that it generates control signals for the frequency converters using a carrier-based method. Preferably, the control device will generate the control signals for the frequency converters in such a way that the carrier signals for generating the multi-level voltage do not have a phase shift.

The control device can also be configured in such a way that it generates control signals for the frequency converters using a sine-triangle method.

The frequency converters are preferably inductively decoupled on the system side. The frequency converters can be connected to inductors, for example, on the system side.

The frequency converters can also be connected to a line transformer on the system side for example, which line transformer has at least two secondary-side winding systems which are electrically isolated from one another, wherein the at least two frequency converters are connected to different ones of the at least two secondary-side winding systems which are electrically isolated from one another.

The control device is preferably furthermore configured in such a way that it distributes the electrical losses occurring in the frequency converters equally, at least approximately equally, among the frequency converters.

The control device can also be configured in such a way that it regulates circulating currents which occur between the frequency converters despite the electrical isolation in a targeted manner.

The arrangement preferably forms a wind or water energy installation for generating electrical energy and preferably has at least one propeller, which is connected to the generator.

The generator can comprise, for example, a rotor and a stator, wherein the stator has at least two stator modules which are electrically independent of one another and which each interact with the rotor, wherein each of the stator modules comprises in each case at least one module-specific magnet and at least one winding, through which at least some of the magnetic flux of the magnet flows, and each of the stator modules with the rotor forms in each case one module-specific magnetic circuit, wherein, in the event of a relative movement between the rotor and the stator, each stator module generates a module-specific output voltage, wherein the windings of the stator modules are floating and electrically isolated from one another, and wherein the at least two frequency converters are connected on the generator side directly or indirectly to the floating and electrically isolated windings of the stator modules.

Moreover, it is considered to be advantageous if all of the frequency converters and the switches contained in the frequency converters are subjected to an electrical load which is as uniform as possible. If switches within the frequency converters are identical, these should be operated identically, when averaged over time. If switches within the frequency converters are subjected to different loads, the load distribution should be optimized taking into consideration the individual loading capacity.

Moreover, it is also possible to measure the temperature of the switches within the frequency converters and to optimize the operation of the switches to the extent that all of the switches are operated at where possible the same operating temperature by the control device.

The above-described arrangements make it possible to provide a multiplicity of frequency converters in order to generate a multiplicity of different voltage levels on the output side. The more voltage levels there are, the better the output signal from the frequency converters can be matched to a sinusoidal profile with a fundamental of 50 Hz or 60 Hz, for example. This will be explained briefly below: if two frequency converters are used and the frequency converters are operated at a switching frequency of 1 kHz, for example, an interference frequency is generated at 2 kHz which needs to be filtered out by means of a downstream filter. If, on the other hand, more than two frequency converters are used, the interference frequency shifts to a multiple of the switching frequency of 1 kHz. If, for example, six frequency converters are used, the interference frequency is approximately 6 kHz; the increase in the interference frequency simplifies the filtering, and smaller and less expensive filters can be used. In other words, an interesting aspect of the above-described arrangements therefore consists in that the interference frequencies can be shifted to relatively high frequencies by virtue of the use of several frequency converters in order to enable the use of simpler and less expensive filters.

Accordingly, also considered advantageous is an arrangement with a control device which is suitable for implementing a multi-level modulation method, wherein the arrangement has at least two frequency converters and a generator with windings, the control device is connected to the frequency converters for actuation thereof, the frequency converters are connected to one another on the output side in such a way that, on actuation by the control device, they generate a multi-level output voltage which can be fed into an energy supply system on the output side, and the frequency converters are electrically isolated from one another on the input side and are fed by windings of the generator, which are floating and electrically isolated from one another.

Figure 2:
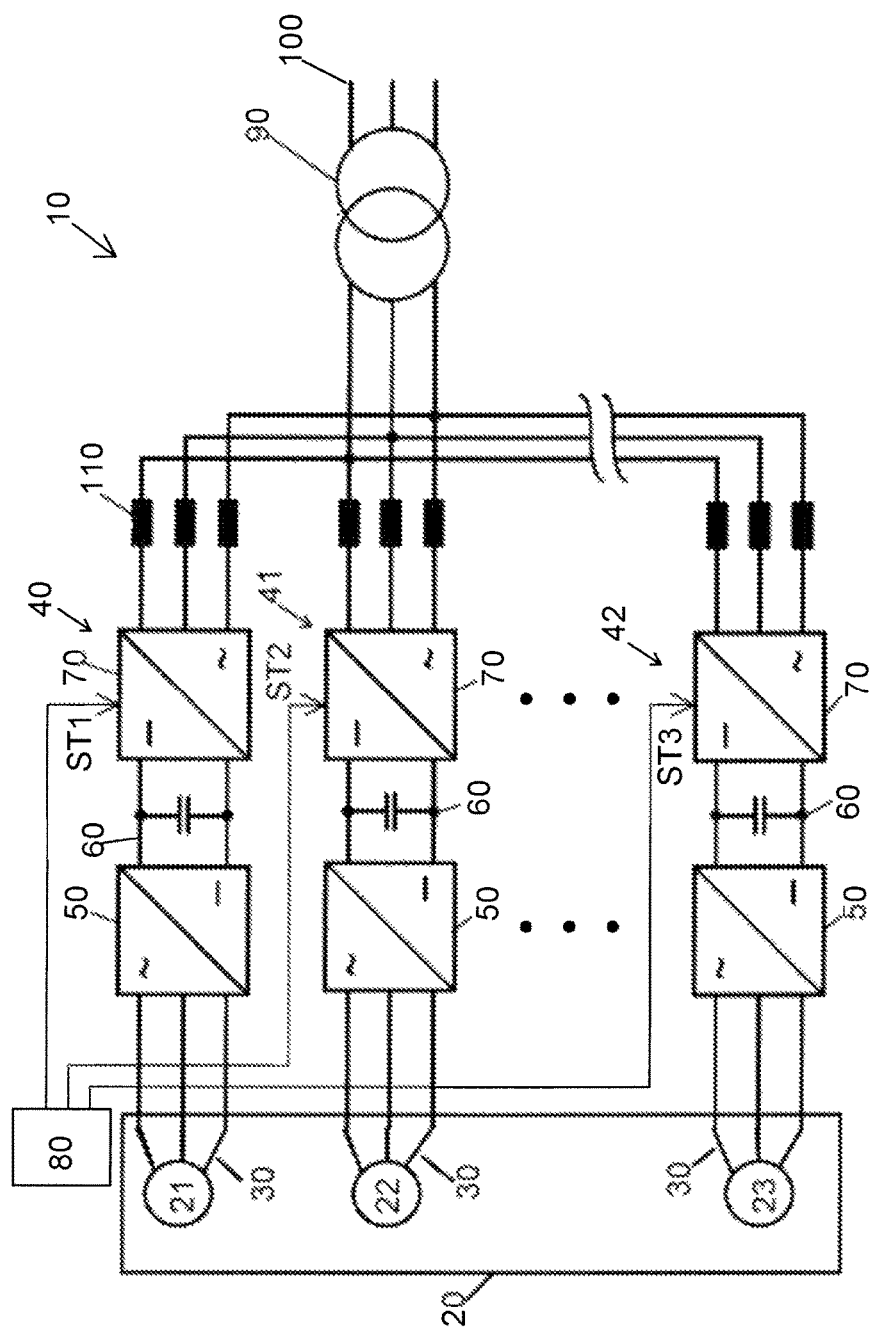
Figure 3:
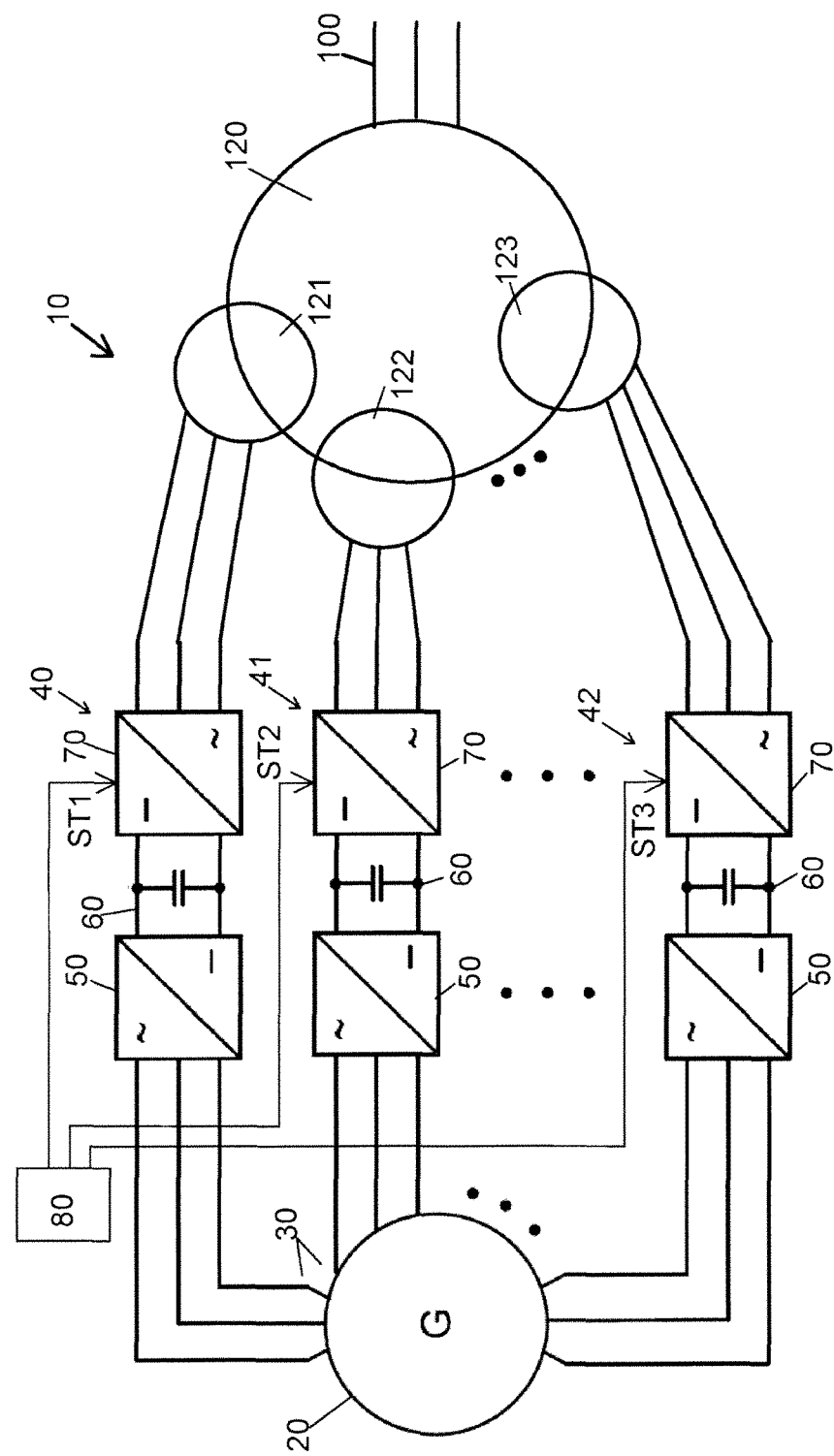
Figure 4:
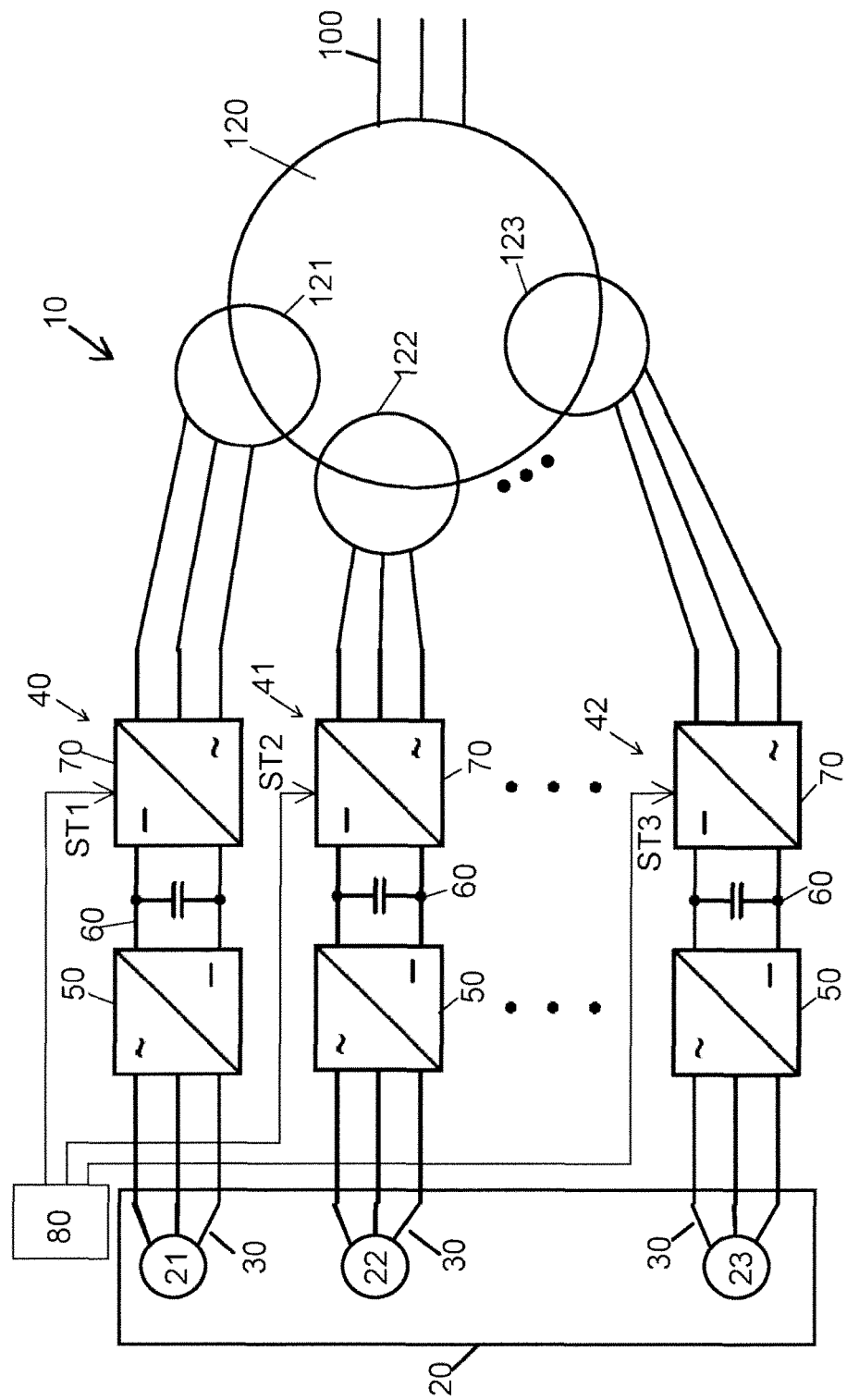

The invention will be explained in more detail below with reference to exemplary embodiments; by way of example FIG. 1 shows a first exemplary embodiment of an arrangement according to the invention with a generator and inductors, FIG. 2 shows a second exemplary embodiment of an arrangement according to the invention with a generator having a plurality of generator units and with inductors, FIG. 3 shows a third exemplary embodiment of an arrangement according to the invention with a generator and a line transformer, which has a plurality of secondary-side winding systems which are electrically isolated from one another, and FIG. 4 shows a fourth exemplary embodiment of an arrangement according to the invention with a generator having a plurality of generator units and with a line transformer, which has a plurality of secondary-side winding systems which are electrically isolated from one another.

For reasons of clarity, the same reference symbols are always used for identical or comparable components in the figures.

FIG. 1 shows an arrangement 10 with a generator 20, which has a multiplicity of electrically isolated winding systems 30. In each case indirectly or directly, a frequency converter 40, 41 and 42 is connected to each of these winding systems 30.

The frequency converters 40, 41 and 42 each comprise a rectifier 50, a DC voltage intermediate circuit 60 and an inverter 70. The rectifiers 50 and the DC voltage intermediate circuits 60 of the frequency converters are electrically isolated from one another.

FIG. 1 also shows that the frequency converters are connected indirectly in parallel on the energy supply system side in the individual phases.

A control device 80, which actuates the inverters 70 with individual control signals ST1 to ST3, is connected to the inverters 70 of the frequency converters 40, 41 and 42. The actuation by the control signals ST1 to ST3 has the effect that the inverters 70 together generate a voltage with a multi-level characteristic and feed this voltage into the transformer 90 and therefore into the downstream energy supply system 100.

The control device 80 will actuate the inverters 70 preferably with individual pulse-width-modulated control signals ST; the control signals ST1 to ST3 can be generated by the control device 80, for example in accordance with a space vector method or a sine-triangle method (cf. international patent application WO 2009/003959 A1). Preferably, the control device 80 will generate the control signals using a carrier-based method, wherein the carrier signals generated by the carrier-based method are preferably free of any phase shifts for the purpose of generating the multi-level voltage.

In the exemplary embodiment shown in FIG. 1, the frequency converters 40, 41 and 42 are connected to inductors 110 on the system side and thus inductively decoupled. The inductors 110 are electrically connected to one another between the frequency converters 40, 41 and 42 and the transformer 90.

FIG. 2 shows a second exemplary embodiment of an arrangement 10 for feeding electrical energy into the energy supply system 100. In this second exemplary embodiment, the generator 20 is formed by a multiplicity of preferably independent generator units 21, 22 and 23, which have winding systems 30 which are electrically isolated from one another. Otherwise, the second exemplary embodiment corresponds to the first exemplary embodiment.

FIG. 3 shows a third exemplary embodiment of an arrangement 10 for feeding electrical energy into the energy supply system 100. In this third exemplary embodiment, a line transformer 120 is provided instead of the inductors 110 (cf. FIGS. 1 and 2) for the inductive decoupling. The line transformer 120 has a multiplicity of secondary-side winding systems 121, 122 and 123 which are electrically isolated from one another. The frequency converters 40, 41 and 42 are in each case connected to an individual secondary-side winding system 121, 122 and 123 for the inductive decoupling. Otherwise, the third exemplary embodiment corresponds to the first exemplary embodiment.

FIG. 4 shows a fourth exemplary embodiment of an arrangement 10 for feeding electrical energy into the energy supply system 100. In this fourth exemplary embodiment, a line transformer 120 is provided instead of the inductors 110 (cf. FIGS. 1 and 2) for the inductive decoupling, as has already been described in connection with FIG. 3. The generator 20 is formed by a multiplicity of preferably independent generator units 21, 22 and 23, as have already been described in connection with FIG. 2. Otherwise, the fourth exemplary embodiment corresponds to the first exemplary embodiment.

REFERENCE SYMBOLS

10 Arrangement
20 Generator
30 Electrically isolated winding systems
40 Frequency converter
41 Frequency converter
42 Frequency converter
50 Rectifier
60 DC voltage intermediate circuit
70 Inverter
80 Control device
90 Transformer
100 Energy supply system
110 Inductor
120 Line transformer
121 Electrically isolated, secondary-side winding system
122 Electrically isolated, secondary-side winding system
123 Electrically isolated, secondary-side winding system
ST1 Control signal
ST2 Control signal
ST3 Control signal

The invention claimed is:

1. An arrangement for feeding electrical energy into an energy supply system, comprising:
   a generator with electrically isolated winding systems; and at least two frequency converters with isolated intermediate circuits, each frequency converter being connected directly or indirectly to a winding system of the generator, wherein the at least two frequency converters are connected to a line transformer on a system side, the line transformer having at least two secondary-side winding systems that are electrically isolated from each other, the at least two frequency converters being connected to different ones of the at least two secondary-side winding systems;

the arrangement has at least one control device, to which the frequency converters are connected for actuation thereof, the control device being configured to determine switching states of each of the at least two frequency converters with an aid of a multi-level PWM modulator with at least three levels;

the at least two frequency converters, on actuation by the at least one control device, feed current by means of a voltage with a multi-level characteristic into the energy supply system;

the at least two frequency converters each generate a partial voltage; and the voltage with the multi-level characteristic is formed by the partial voltages of the at least two frequency converters.

2. The arrangement as claimed in claim 1, wherein the voltage with the multi-level characteristic is formed by the partial voltages of the at least two frequency converters or by incorporating a phasor addition of voltage phasors.

3. The arrangement as claimed in claim 2, wherein the voltage with the multi-level characteristic is formed by incorporating the phasor addition of the voltage phasors of the partial voltages.

4. The arrangement as claimed in claim 2, wherein the voltage with the multi-level characteristic is formed by incorporating the phasor addition of voltage phasors which are proportional to the voltage phasors of the partial voltages.

5. The arrangement as claimed in claim 1, wherein the at least one control device actuates the frequency converters in such a way that the voltage with the multi-level characteristic which is formed by the partial voltages of the frequency converters at least approximately corresponds to a system voltage of the energy supply system.

6. The arrangement as claimed in claim 5, wherein the voltage with the multi-level characteristic deviates from the system voltage to the extent that a desired active and reactive power feed into the energy supply system takes place.

7. The arrangement as claimed in claim 1, wherein the at least two frequency converters each have a rectifier, a DC voltage intermediate circuit and an inverter, the rectifiers and the DC voltage intermediate circuits of the at least two frequency converters are electrically isolated from one another, and the at least one control device is connected to the inverters of the frequency converters.

8. The arrangement as claimed in claim 1, wherein the at least one control device is distributed between the at least two frequency converters.

9. The arrangement as claimed in claim 1, wherein the at least one control device is configured in such a way that it generates control signals for the at least two frequency converters using a space vector method.

10. The arrangement as claimed in claim 1, wherein the at least one control device is configured in such a way that it generates control signals for the at least two frequency converters using a carrier-based method.

11. The arrangement as claimed in claim 10, wherein the at least one control device is embodied in such a way that, using the carrier-based method, it generates carrier signals which do not have a phase shift for generating the voltage with the multi-level characteristic.

12. The arrangement as claimed in claim 1, wherein the at least one control device is configured in such a way that it generates control signals for the at least two frequency converters using a sine-triangle method.

13. The arrangement as claimed in claim 1, wherein the at least one control device is configured in such a way that it distributes the electrical losses occurring in the at least two frequency converters equally among the frequency converters.

14. The arrangement as claimed in claim 1, wherein the at least one control device is configured in such a way that it regulates circulating currents which occur between the at least two frequency converters.

15. The arrangement as claimed in claim 1, wherein the arrangement forms a wind or water energy installation for generating electrical energy and has at least one propeller, which is connected to the generator.

16. The arrangement as claimed in claim 1, wherein the generator comprises a rotor and a stator, the stator has at least two stator modules which are electrically independent of one another and which each interact with the rotor, each of the at least two stator modules comprises in each case at least one module-specific magnet and at least one winding, through which at least some of the magnetic flux of the magnet flows, and each of the stator modules with the rotor forms in each case one module-specific magnetic circuit, in the event of a relative movement between the rotor and the stator, each of the at least two stator modules generates a module-specific output voltage, the windings of the at least two stator modules are floating and electrically isolated from one another, and the at least two frequency converters are connected on a generator side directly or indirectly to the floating and electrically isolated windings of the at least two stator modules.

17. The arrangement as claimed in claim 1, wherein the generator with electrically isolated winding systems is a single generator.

* * * * *